United States Patent Office.

OSCAR M. BARTHOLOMEW, OF ELMIRA, NEW YORK, ASSIGNOR TO HIMSELF AND W. P. SHERMAN, OF SAME PLACE.

Letters Patent No. 69,612, dated October 8, 1867.

IMPROVED ROOFING COMPOUND.

*The Schedule referred to in these Letters Patent and making part of the same.*

TO ALL WHOM IT MAY CONCERN:

Be it known that I, OSCAR M. BARTHOLOMEW, of Elmira, in the county of Chemung, and State of New York, have invented a new and useful improvement in Composition for Covering the Roofs of Houses, and which I denominate "Sherman's Elastic Metallic Roofing;" and I do hereby declare that the following is a full, clear, and exact description of the mode of compounding and preparing the same.

Take equal parts of the following ingredients: First, calcined plaster of Paris; second, hydrate of lime; third, mineral paint; and fourth, marble dust. Mix the foregoing ingredients thoroughly with coal tar to make an adhesive paste, and then apply to paper, felting, tin, board, shingle, or any other kind of roof.

What I claim as my invention, and desire to secure by Letters Patent, is—

A composition of matter compounded from the ingredients named, and in the manner substantially as and for the purpose set forth.

In testimony whereof I have signed my name to this specification in the presence of two subscribing witnesses.

OSCAR M. BARTHOLOMEW.

Witnesses:
SAM'L G. STRYKS,
R. R. SOPER.